(12) United States Patent
Biskeborn et al.

(10) Patent No.: US 7,400,474 B2
(45) Date of Patent: Jul. 15, 2008

(54) CONDUCTIVE PAIRING FOR PIGGYBACK MAGNETIC HEAD

(75) Inventors: Robert Glenn Biskeborn, Hollister, CA (US); Peter VanderSalm Koeppe, San Diego, CA (US)

(73) Assignee: International Business Machines Corporation, Armonk, NY (US)

( * ) Notice: Subject to any disclaimer, the term of this patent is extended or adjusted under 35 U.S.C. 154(b) by 428 days.

(21) Appl. No.: 11/262,203

(22) Filed: Oct. 28, 2005

(65) Prior Publication Data

US 2007/0097556 A1    May 3, 2007

(51) Int. Cl.
G11B 5/39    (2006.01)
G11B 5/31    (2006.01)

(52) U.S. Cl. .................. 360/323; 360/316; 360/317

(58) Field of Classification Search .............. 360/316, 360/317, 323
See application file for complete search history.

(56) References Cited

U.S. PATENT DOCUMENTS

| | | | |
|---|---|---|---|
| 4,170,033 A | 10/1979 | Ridgway et al. | 360/121 |
| 4,623,867 A | 11/1986 | Lundquist et al. | 338/32 |
| 4,972,286 A | 11/1990 | Jurisch et al. | 360/126 |
| 5,142,425 A | 8/1992 | Gailbreath, Jr. et al. | 360/123 |
| 5,247,413 A | 9/1993 | Shibata et al. | 360/113 |
| 5,272,582 A | 12/1993 | Shibata et al. | 360/113 |
| 5,491,600 A | 2/1996 | Chen et al. | 360/113 |
| 5,491,605 A | 2/1996 | Hughbanks et al. | 360/113 |
| 5,539,598 A | 7/1996 | Denison et al. | 360/113 |
| 5,557,492 A | 9/1996 | Gill et al. | 360/113 |
| 5,663,856 A | 9/1997 | Packard | 360/122 |
| 5,757,591 A | 5/1998 | Carr et al. | 360/113 |
| 5,761,009 A | 6/1998 | Hughbanks et al. | 360/113 |
| 5,764,446 A | 6/1998 | Seagle | 360/113 |
| 5,829,702 A | 11/1998 | Zweighaft | 242/334.6 |
| 5,850,324 A | 12/1998 | Wu et al. | 360/113 |
| 5,978,181 A | 11/1999 | Niijima et al. | 360/113 |
| 6,081,409 A | 6/2000 | Hughbanks et al. | 360/128 |
| 6,160,688 A | 12/2000 | Okumura | 360/323 |
| 6,246,553 B1 | 6/2001 | Biskeborn | 360/323 |

(Continued)

FOREIGN PATENT DOCUMENTS

EP    0634739    1/1995

(Continued)

OTHER PUBLICATIONS

T. A. Schwarz, "Perpendicular Read/Write Head With High Reluctance Leg", IBM Technical Disclosure Bulletin, vol. 24, No. 4, Sep. 1981.

*Primary Examiner*—William J Klimowicz
(74) *Attorney, Agent, or Firm*—Zilka-Kotab, PC

(57) ABSTRACT

A magnetic tape head having an array of reader/writer pairs formed on a common substrate, each reader/writer pair being configured in a piggyback configuration such that the writer and reader of each pair are aligned in a direction parallel to a relative direction of media travel thereover. Each reader comprises a first shield, a second shield, a sensor positioned between the shields, and leads coupled to the sensor. Each writer comprises a first pole and a second pole. A charge clamp circuit electrically couples at least one of the reader shields to at least one of the leads. An electrical conductor operatively electrically couples the at least one of the shields to at least one of the poles.

8 Claims, 3 Drawing Sheets

U.S. PATENT DOCUMENTS

| | | | |
|---|---|---|---|
| 6,330,123 B1 | 12/2001 | Schwarz et al. | 360/75 |
| 6,542,321 B1* | 4/2003 | Molstad et al. | 360/31 |
| 6,760,199 B2 | 7/2004 | Biskeborn | 360/323 |
| 6,826,020 B2* | 11/2004 | Daby et al. | 360/317 |
| 6,914,756 B2* | 7/2005 | Molstad et al. | 360/316 |
| 7,042,683 B1* | 5/2006 | Cross et al. | 360/319 |
| 7,151,651 B1* | 12/2006 | Cross et al. | 360/319 |
| 2003/0016474 A1* | 1/2003 | Biskeborn | 360/319 |
| 2004/0090715 A1* | 5/2004 | Hsiao et al. | 360/323 |

FOREIGN PATENT DOCUMENTS

| | | |
|---|---|---|
| JP | 06215321 | 8/1994 |
| JP | 10055518 | 2/1998 |
| JP | 2002358608 A * | 12/2002 |

* cited by examiner

CONDUCTIVE PAIRING FOR PIGGYBACK MAGNETIC HEAD

FIELD OF THE INVENTION

This invention relates generally to piggyback read/write head arrays for magnetic data stores and more particularly to a read/write shield-pairing technique for optimizing head surface tribology.

BACKGROUND OF THE INVENTION

Business, science and entertainment applications depend upon computers to process and record data, often with large volumes of the data being stored or transferred to nonvolatile storage media, such as magnetic discs, magnetic tape cartridges, optical disk cartridges, floppy diskettes, or floptical diskettes. Typically, magnetic tape is the most economical means of storing or archiving the data. Storage technology is continually pushed to increase storage capacity and storage reliability. Improvement in data storage densities in magnetic storage media, for example, has resulted from improved medium materials, improved error correction techniques and decreased areal bit sizes. The data capacity of half-inch magnetic tape, for example, is now measured in hundreds of gigabytes on 512 or more data tracks.

The improvement in magnetic medium data storage capacity arises in large part from improvements in the magnetic head assembly used for reading and writing data on the magnetic storage medium. A major improvement in transducer technology arrived with the magnetoresistive (MR) sensor originally developed by the IBM® Corporation. The MR sensor transduces magnetic field changes in an MR stripe to resistance changes, which are processed to provide digital signals. Data storage density can be increased because an MR sensor offers signal levels higher than those available from conventional inductive read heads for a given bit area. Moreover, the MR sensor output signal depends only on the instantaneous magnetic field intensity in the storage medium and is independent of the magnetic field time-rate-of-change arising from relative sensor/medium velocity. In operation the magnetic storage medium, such as tape or a magnetic disk surface, is passed over the magnetic read/write (R/W) head assembly for reading data therefrom and writing data thereto.

The quantity of data stored on a magnetic tape may be increased by increasing the number of data tracks across the tape. More tracks are made possible by reducing feature sizes of the read and write elements, such as by using thin-film fabrication techniques and MR sensors.

The interleaved R/W magnetic tape head with MR sensors allows increased track density on the tape medium while providing bi-directional read-while-write operation of the tape medium to give immediate read back verification of data just written onto the tape medium. Tape recording systems may alternatively implement arrays of "piggyback" R/W pairs, where the writer and reader in each pair are aligned in the direction of tape travel.

Tape and other magnetic heads in particular suffer from adverse tribological interactions, which include electrical discharge, tape changes, head wear, head erosion, debris buildup, chemical conversion, head MR shorting, etc.

Tape and other magnetic heads in particular suffer from head-tape interactions caused by motion of the magnetic recording tape. Repeated passes of the tape medium over the wear-resistant tape head surface may eventually produce head-tape interface changes, which can impair head performance. This can be a particular problem for thin-film magnetic heads where the thin-film layer structure sees intense exposure to large regions of tape with brief operation, giving a higher risk of such effects as accumulation, corrosion, wear, shorting, etc. which in turn reduce the effective lifetime of the magnetic head assembly. Practitioners in the art may provide wear-resistant layers on the air bearing surfaces of magnetic heads to inhibit these interactions, for example, a sputtered layer of diamond-like carbon or hard aluminum oxide, but such layers are also very thin, being perhaps 20 nanometers thick to minimize tape-to-head spacing loss, and must generally be deposited onto pre-recessed heads.

While tribological mechanisms are not perfectly understood in the art, one problem is believed to arise from accelerated tribological interactions in line with the write gap, which is disadvantageous for head-assembly life-expectancy. The interactions are typically media-dependent and can be severe enough to make certain media incompatible with such head assemblies.

In piggyback heads, because of the close proximity of the reader and the writer in each R/W pair, tribological effects are believed to be caused by voltage swings on electrically floating writer poles. The relative motion between the head and recording medium may produce huge voltage swings on the writer poles, which are electrically isolated in current piggyback heads. Large voltages are strongly implicated in unfavorable tribological processes such as wear, accumulations and corrosion. For example, the high potentials generated on the writer poles can aggravate electrochemical reactions, poletip corrosion, and electrostatic accumulation of debris.

Additionally, in piggyback heads, one write pole is in very close proximity to the nearest reader shield, separated therefrom by only a thin insulator that may be less than 1 micron thick. The voltage differences between the adjacent reader shield and writer pole tip is problematic due to their close proximity. Electric potentials generated on the writer pole tips create huge potential gradients, i.e., large electric fields. This can potentially lead to electrostatic discharge from the writer pole tip to the reader shield, which in turn causes a noise spike in a readback signal. The noise spike in turn results in a readback error. Worse, the electric fields are implicated in aggravated accumulation of conductive materials that can actually short the MR sensor to its shields.

Consider the following example. Suppose reader shield S2 and writer pole P1 in a piggyback R/W pair are only separated by a thin insulator. Suppose S2 is at 1.5 V, and P1 is at 6.5V. The difference is 5 V. If the space between them is 0.5 microns, the electric field (gradient) is 10V per micron, which is a huge gradient at those dimensions. For comparison, a spark from a sweater occurs from a gradient of 1V per micron. In the example presented, the gradient is 10× that. Other unusual effects have been observed, including formation of solid water (essentially ice) at room temperature in the effect of a very high electric field. This problem is less of an issue in interleaved heads, where the writer poles and reader shields are hundreds of microns apart.

Several solutions have been contemplated in the prior art, but are not favorable. These solutions include connecting each writer pole directly to ground, possibly via a resistor or resistors, or to a separate power supply, or to a bus bar connected to ground, possibly via a resistor, or to a power supply or voltage controller. Connecting each writer pole to ground clamps voltages of all the writer poles in a multi-track head to one value. But the voltages of the companion reader shields generally vary from track to track and change depending on drive operation. This produces writer pole-reader shield voltage differences which are smaller but still unfavorable from a triobological as well as electrostatic discharge standpoint. In addition, such writer pole grounding methods require additional processing steps and wafer real estate, which may not be available. Finally, heads with write poles tied to ground may malfunction when there is a single point conductive defect between the write coils and poles.

There is accordingly a clearly-felt need in the art for a wear-resistant piggyback read/write head assembly with improved tribological characteristics. These unresolved problems and deficiencies are clearly felt in the art and are solved by this invention in the manner described below.

SUMMARY OF THE INVENTION

The present invention overcomes the aforementioned disadvantages by providing a magnetic tape head having an array of reader/writer pairs formed on a common substrate, each reader/writer pair being configured in a piggyback configuration such that the writer and reader of each pair are aligned in a direction parallel to a relative direction of media travel thereover. Each reader comprises a first shield, a second shield, a sensor positioned between the shields, and leads coupled to the sensor. Each writer comprises a first pole, a second pole, and a coil. A charge clamp circuit electrically couples at least one of the reader shields to at least one of the reader leads. An electrical conductor operatively electrically couples the at least one of the shields to at least one of the poles. The electrical conductor may entail a direct electrical connection to one or both shields, or connection directly to the charge clamp circuit. The resistance of the conductor may be adjusted for optimal tribological results. Accordingly, resistance values of up to approximately 500 kilo-Ohms (kOhms) are acceptable. Larger values may result in transient pole tip voltage excursions of greater than 0.1 V, which is not desirable.

Any of these embodiments may be implemented in a tape drive system, which may include a magnetic head as recited above, a drive mechanism for passing a magnetic recording tape over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best mode presently contemplated for carrying out the present invention. This description is made for the purpose of illustrating the general principles of the present invention and is not meant to limit the inventive concepts claimed herein. Further, particular features described herein can be used in combination with other described features in each of the various possible combinations and permutations.

Figure 1:
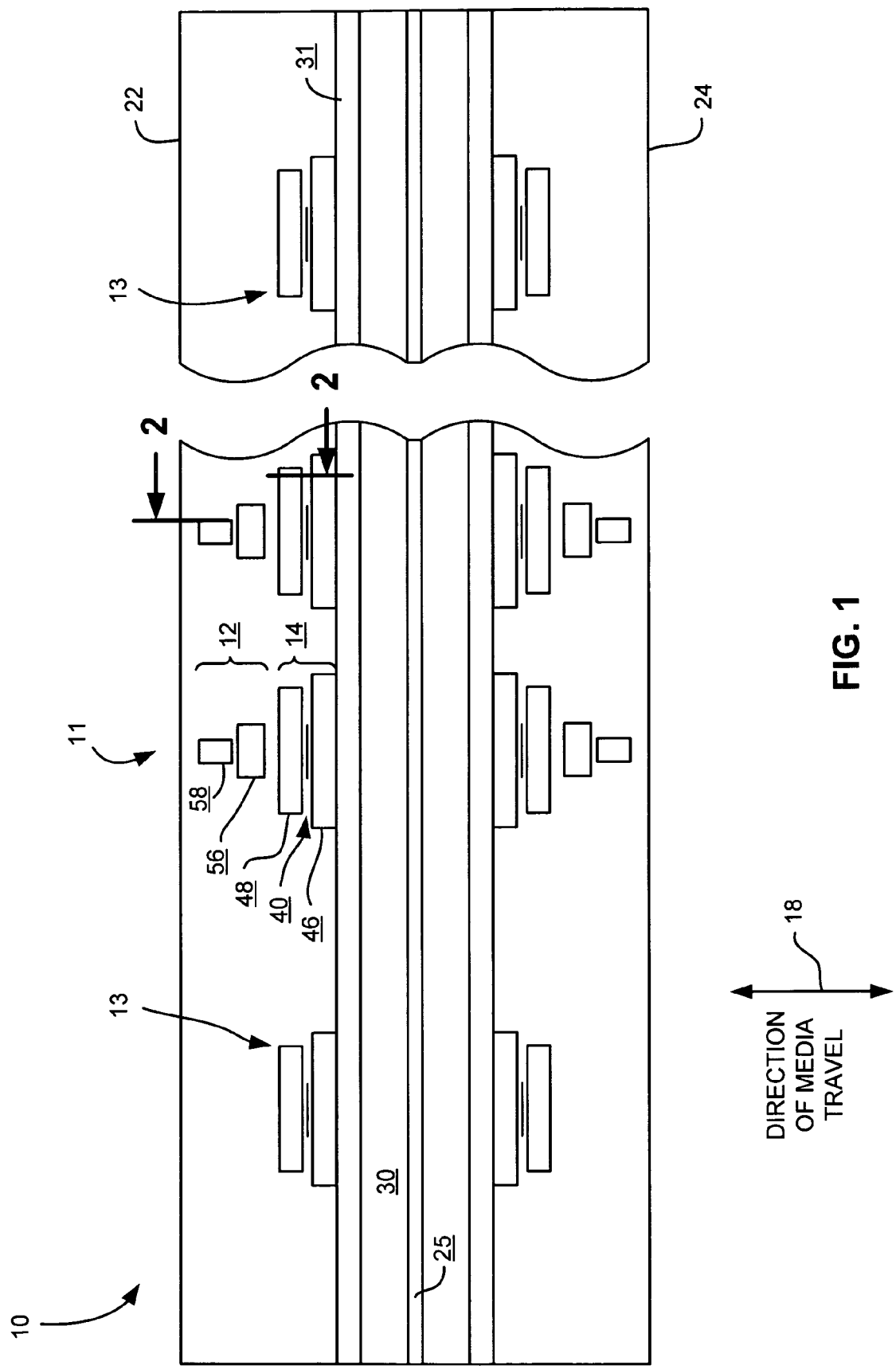
FIG. 1 is a representative tape bearing surface view of a multitrack tape head having a multitude of R/W pairs in a piggyback configuration according to one embodiment of the present invention.

FIG. 1 shows the tape bearing surface (TBS) of an embodiment of a magnetoresistive (MR) head assembly 10 having a plurality of R/W pairs in a piggyback configuration formed on a common substrate 30 and an optional electrically insulative layer 31. The writers, exemplified by the write head 12 and the readers, exemplified by the read head 14, are aligned parallel to a direction of travel of a tape medium thereacross to form a R/W pair, exemplified by the R/W pair 11. Several R/W pairs 11 may be present, such as 8, 16, 32 pairs, etc. The R/W pairs 11 as shown are linearly aligned in a direction generally perpendicular to a direction of tape travel thereacross. However, the pairs may also be aligned diagonally, staggered, in a V-shape, etc. Servo readers 13 are positioned on the outside of the array of R/W pairs, the function of which is well known.

Generally, the magnetic tape medium moves in either a forward or reverse direction as indicated by arrow 18. The magnetic tape medium and head assembly 10 operate in a transducing relationship in the manner well-known in the art.

The piggybacked MR head assembly 10 includes two thin-film modules 22 and 24 of generally identical construction. Modules 22 and 24 are joined together with adhesive layer 25 to form a single physical unit to provide read-while-write capability by activating the writer of the leading module and reader of the trailing module aligned with the writer of the leading module parallel to the direction of tape travel relative thereto.

When a module 22, 24 of a piggyback head 10 is constructed, layers are formed on a substrate 30 in generally the following order for the R/W pairs 11: an insulating layer 31, a first shield 46 typically of an iron alloy such as NiFe (permalloy), CZT or Al—Si—Fe (Sendust), a sensor 40 for sensing a data track on a magnetic medium, a second shield 48 typically of a nickel-iron alloy (e.g., 80/20 Permalloy), first and second writer pole tips 56, 58, and a coil (not shown). The first and second writer poles 56, 58 are fabricated from high magnetic moment materials such as 45/55 NiFe. Note that these materials are provided by way of example only, and other materials can be used. Additional layers such as insulation between the shields and/or pole tips and surrounding the sensor may be present. Illustrative materials for the insulation include alumina and other oxides, insulative polymers, etc.

Figure 2:
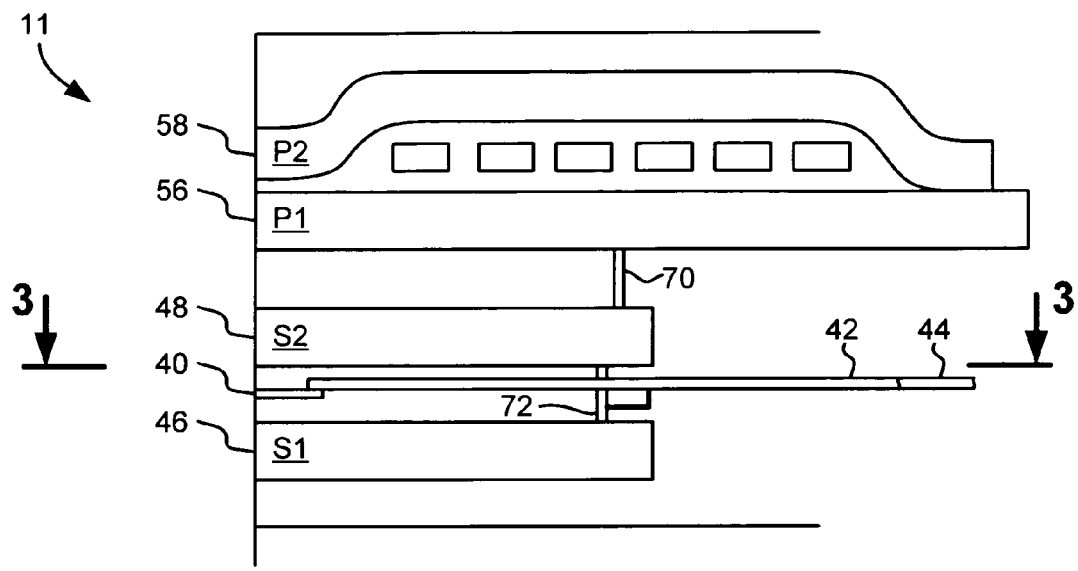
FIG. 2 is a partial cross sectional view taken from Line 2-2 of FIG. 1.

FIG. 2 shows in detail a portion of module 22 from FIG. 1, including portions of an exemplary R/W pair 11. The thin-film elements shown in FIG. 2 are illustrated showing submicron detail in the usual manner and are not to scale. Considering first the reader 14, a magnetoresistive (MR, GMR, TMJ, etc.) sensor element 40 is disposed between the two shields 46 and 48 (S2 & S1), with each MR sensor end coupled to an electrical lead conductor 42 and 44. The relative disposition of electrical lead conductors 42-44 may be better appreciated with reference to FIG. 3, which illustrates a cross-sectional view of the reader 14 from FIG. 2 taken along section line 3-3.

In tape systems, the shields can become charged by the action of the tape brushing thereacross. If the shields are floating (not connected or grounded), they will charge up to a high voltage (e.g., 10V or higher), then discharge. The backside of the tape does not have a magnetic coating. Rather, the backside of the tape is rougher than the magnetic side. The roughness assists in winding the tape onto a reel. To make the backside of the tape rough, carbon particles are formed thereon. The carbon itself can flake off and run across the tape-head interface, creating electrically conductive bridging. The particles can create enough of a bridge to initiate a discharge of the shield into the sensor, creating a spike in the signal. A charge clamp circuit removes the charge, and keeps the shield at roughly the same voltage as the sensor, as described immediately below.

Figure 3:
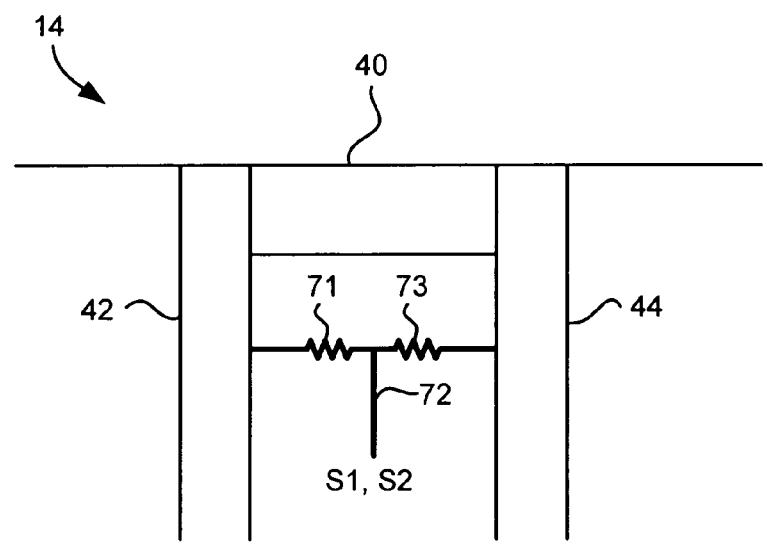
FIG. 3 is a partial cross sectional view taken from Line 3-3 of FIG. 2.

According to an embodiment of the invention, within each read head, which is exemplified by reader 14, MR element shields 46, 48 may also be connected to the leads 42, 44 of the sensor 40 via a circuit 72 in a configuration referred to as a charge clamp, as shown in FIGS. 2 and 3. As shown in FIG. 3, resistors 71, 73 are positioned between the leads 42, 44, thereby forming a conducting path from leads 42 to 44. These must be large enough so as not to short circuit the MR reader. Resistors 71, 73 are preferably of equal magnitude for reasons which will soon become apparent, but may be of differing magnitude. The resistors 71, 73 may have a resistance of less than about 500 kilo-Ohms (kOhms). Also note that resistors 71, 73 may each be formed of multiple resistors.

The shields 46, 48 are coupled to the circuit at a point between the resistors 71, 73. The circuit acts as a voltage divider, where the voltage of the shields is at a level near a midpoint between the lead voltages, e.g., $V_{midpoint}=(V_{lead1}+V_{lead2})/2$. This midpoint is about the voltage of the midpoint of the sensor 40 between the leads 42, 44. Thus, the sensor 40 and shields 46, 48 are at about the same voltage. Because they are at about the same voltage, tribological effects such as wear, corrosion and accumulations are reduced. Further, the chance of an electrical discharge, e.g., spark, between the shields 46, 48 and the sensor 40 is minimized.

In accordance with this invention, as schematically illustrated in FIGS. 2-3, an electrical connection 70 is established between the electrically-conductive MR element S2 shield 48 and the immediately-adjacent lower pole piece 56. Electrical connection 70 and charge clamp circuit 72 are preferably established for each piggyback R/W head pair and are implemented in FIG. 2 by the electrical conductor 70 and charge clamp circuit 72, which are merely one of many useful means for conductively coupling the shields 46, 48 and the lower pole piece 56.

The electrical connections exemplified by electrical conductor 70 and charge clamp circuit 72 (FIG. 2) may be made independently for each reader-writer pair. Electrical conductor 70 and charge clamp circuit 72, or portions thereof, are preferably non-magnetic and may be formed by depositing a layer of conductive metal, such as copper or gold, or any other useful material of low to intermediate resistivity, such as tantalum. The electrical conductor 70 and charge clamp circuit 72, or portions thereof, can also be formed by creating a via which is filled with an electrically conductive material such as copper or gold. In one preferred implementation, conductor 70 is formed by deposition of the nonmagnetic metal between S2 48 and P1 56 (FIG. 2) such that the metal layer covers large portions thereof, as opposed to having a single point of contact as in a "via" connection.

Other embodiments of the present invention implement the electrical conductor 70 using a magnetic metal (e.g., NiFe) having a location of connection which may be positioned not immediately proximate to the sensor, positioned outside the outer diameter of the outermost turn of the coil, and/or symmetric to the magnetic features of both the reader and the writer. Positioning the magnetic metal conductor 70 far from the sensor minimizes magnetic disturbance to the reader sensor. Positioning the electrical conductor 70 outside the outer diameter of the outermost turn of the coil minimizes magnetic coupling from the writer coil, when energized during writing, to the magnetic electrical conductor 70, thereby minimizing magnetic disturbances to the reader structures. Maintaining a symmetrical placement for magnetic symmetry avoids unwanted alteration of the reader's magnetic bias, which could otherwise result from an unsymmetrical placement. An electrical conductor 70 made of a magnetic metal is preferably formed of a single via connection, or multiple via connections, between the two magnetic planes (S2 48 and P1 56 (FIG. 2)).

Electrical conductor 70 and charge clamp circuit 72 may further include a wafer-deposited thin film resistor. Electrical conductor 70 may, for example, have a resistance in the range from about 5 kOhms to about 50 kOhms or more. The electrical conductor 70 preferably has a resistance of less than about 500 kOhms. Larger resistances are not preferred because tribocurrent flowing from tape to ground through the connection can be of the order of, e.g., 100 nanoamperes. This would produce a voltage difference between writer pole 56 and reader shield 48 of 0.05 volts, which is believed to be about the maximum voltage difference that avoids tribological effects.

In operation, the presence of electrical conductor 70 and charge clamp circuit 72 clamps the electrical potential of the upper and lower pole piece components 56 and 58 (coupled together at the back gap) close to that of MR element shield 48, which is clamped to the midpoint of the voltage potentials between the MR electrical lead conductors 42, 44. This arrangement forces the voltage potentials to be nearly the same for both write and read heads 12 and 14, thereby reducing the adverse tribological effects between the two adjacent R/W heads 12, 14. By equalizing the electrical environment over adjacent heads, the erosion of the wear-resistant alumina surface and other related component is equalized. This occurs, for example, because any such wear arising from electrically-enhanced alumina erosion is equalized. Sputtered alumina is known to be less amphiteric, i.e., wear-resistant in acidic and basic environments, such as in conjunction with the head-tape interface at the ABS, than in neutral environments. The inventors have found that this conjectured chemical-mechanical mechanism appears to be influenced by the local electrical environment, which is controlled in the piggyback MR head assembly of this invention by equalizing the robustness of the write heads and the read heads.

Figure 4:
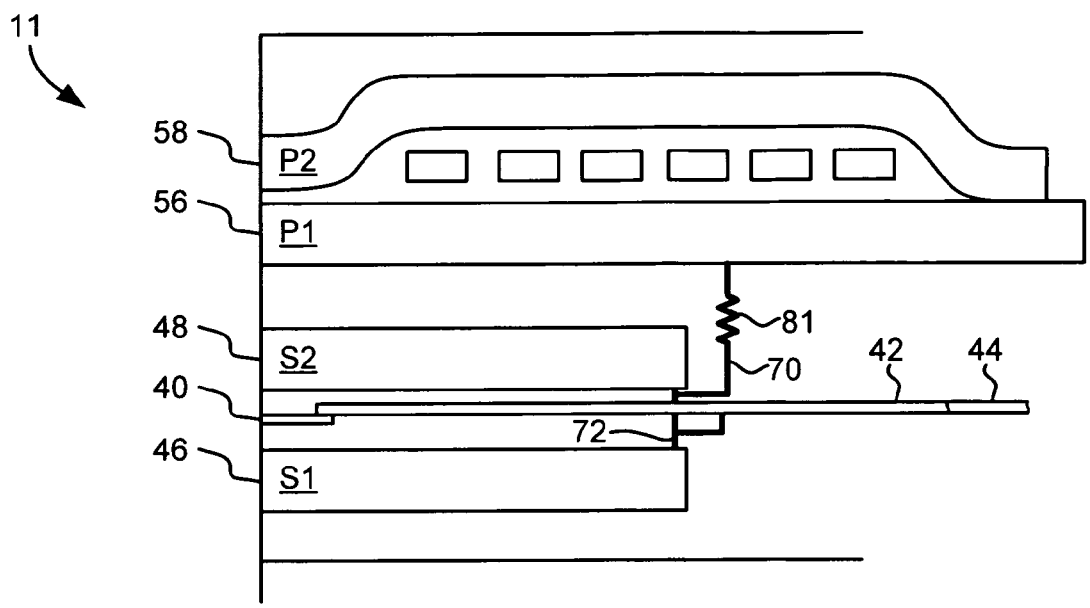
FIG. 4 is a representative partial cross sectional view of a piggyback R/W pair according to another embodiment of the present invention.

In another embodiment of the invention, shown in FIG. 4, conductor 70 couples the lower writer pole 56 directly to charge clamp circuit 72. Also note that conductor 70 in this embodiment includes a resistor 81, as mentioned above. Such an embodiment may be easier to fabricate in some situations, such as where the connections are made behind the shields 46, 48 so as not to disturb the shields 46, 48.

Figure 5:
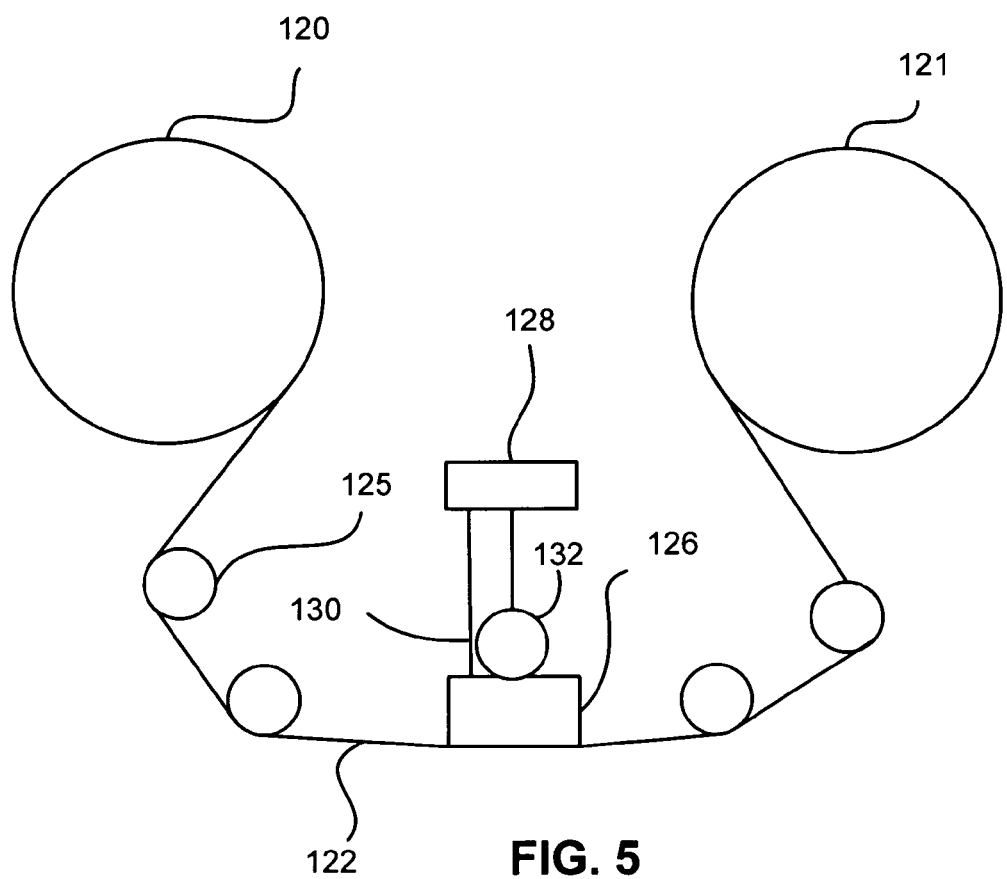
FIG. 5 is a schematic diagram of the tape drive system.

FIG. 5 illustrates a simplified tape drive which may be employed in the context of the present invention. While one specific implementation of a tape drive is shown in FIG. 5, it should be noted that the embodiments of the previous figures may be implemented in the context of any type of tape drive system.

As shown, a tape supply cartridge 120 and a take-up reel 121 are provided to support a tape 122. These may form part of a removable cassette and are not necessarily part of the system. Guides 125 guide the tape 122 across a preferably bidirectional tape head 126, of the type disclosed herein. Such tape head 126 is in turn coupled to a controller assembly 128 via a connector cable 130. The controller 128, in turn, controls head functions such as servo following, write bursts, read functions, etc. An actuator 132 controls position of the head 126 relative to the tape 122.

A tape drive, such as that illustrated in FIG. 5, includes drive motor(s) to drive the tape supply cartridge 120 and the take-up reel 121 to move the tape 122 linearly over the head 126. The tape drive also includes a read/write channel to transmit data to the head 126 to be recorded on the tape 122 and to receive data read by the head 126 from the tape 122. An interface is also provided for communication between the tape drive and a host (integral or external) to send and receive the data and for controlling the operation of the tape drive and communicating the status of the tape drive to the host, all as will be understood by those of skill in the art.

While the piggyback head assembly of this invention is primarily suitable for data tape recording applications, the same fabrication principles could be applied to making a magnetic R/W head assembly for other magnetic recording applications.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A magnetic head, comprising:
   an array of reader/writer pairs formed on a common substrate, each reader/writer pair being configured in a piggyback configuration such that the writer and reader of each pair are aligned in a direction parallel to a relative direction of media travel thereover;
   each reader comprising a first shield, a second shield, a sensor positioned between the shields, and leads coupled to the sensor;
   each writer comprising a first pole and a second pole;
   a charge clamp circuit electrically coupling at least one of the shields to at least one of the leads, wherein the charge clamp circuit includes a pair of resistors, each resistor being coupled to one of the heads; and
   an electrical conductor electrically coupling at least one of the poles directly to the charge clamp circuit, wherein the electrical conductor is electrically coupled to the charge clamp circuit at a point between the resistors.

2. The head as recited in claim 1, wherein the charge clamp circuit includes a pair of resistors, each resistor being coupled to one of the leads, wherein the at least one shield is electrically coupled to the charge clamp circuit at a point between the resistors.

3. The head as recited in claim 2, wherein a resistance of each of the resistors is less than about 500 kOhm.

4. The head as recited in claim 1, wherein both shields are coupled to the charge clamp circuit.

5. The head as recited in claim 1, wherein the electrical conductor includes a resistor.

6. The head as recited in claim 1, wherein the shield and the pole positioned closest together are electrically connected by the electrical conductor.

7. The head as recited in claim 1, wherein the magnetic head is a tape head.

8. A tape drive system, comprising:
   a magnetic head as recited in claim 1;
   a drive mechanism for passing a magnetic recording tape over the magnetic head; and
   a controller electrically coupled to the magnetic head.

* * * * *